(12) United States Patent
Gu et al.

(10) Patent No.: US 9,924,167 B2
(45) Date of Patent: Mar. 20, 2018

(54) VIDEO QUALITY MEASUREMENT CONSIDERING MULTIPLE ARTIFACTS

(75) Inventors: Xiaodong Gu, Beijing (CN); Debing Liu, Beijing (CN); Zhibo Chen, Beijing (CN)

(73) Assignee: THOMSON Licensing, Issy-les-Moulineaux (FR)

(*) Notice: Subject to any disclaimer, the term of this patent is extended or adjusted under 35 U.S.C. 154(b) by 228 days.

(21) Appl. No.: 14/358,114

(22) PCT Filed: Nov. 28, 2011

(86) PCT No.: PCT/CN2011/083020
§ 371 (c)(1),
(2), (4) Date: May 14, 2014

(87) PCT Pub. No.: WO2013/078582
PCT Pub. Date: Jun. 6, 2013

(65) Prior Publication Data
US 2014/0321558 A1  Oct. 30, 2014

(51) Int. Cl.
*H04N 19/103* (2014.01)
*H04N 19/154* (2014.01)
(Continued)

(52) U.S. Cl.
CPC ..... *H04N 19/00933* (2013.01); *H04N 17/004* (2013.01); *H04N 19/103* (2014.11);
(Continued)

(58) Field of Classification Search
CPC ........... H04N 19/00933; H04N 19/103; H04N 19/154; H04N 19/192; H04N 17/004; H04N 19/48; H04N 19/08; H04N 17/0049
(Continued)

(56) References Cited

U.S. PATENT DOCUMENTS 6,493,023 B1   12/2002  Watson
7,733,372 B2   6/2010   Ong et al.
(Continued)

FOREIGN PATENT DOCUMENTS

CN   1416651   5/2003
CN   1462557   12/2003
(Continued)

OTHER PUBLICATIONS

ITU-T: "Objective perceptual multimedia video quality measurement in the presence of a full reference", Recommendation J.247, Aug. 31, 2008, Retrieved from the Internet on Jun. 1, 2015.
(Continued)

*Primary Examiner* — William C Vaughn, Jr.
*Assistant Examiner* — Jae N Noh
(74) *Attorney, Agent, or Firm* — Brian J. Dorini; Xiaoan Lu

(57) ABSTRACT

A particular implementation determines objective distortion levels ($d_i$) respectively for a plurality of artifact types. The objective distortion levels are aligned to ensure that the same distortion level of different types of artifacts corresponds to the same perceived distortion level. The aligned distortion levels ($d_i'$) are sorted to obtain sorted distortion levels ($d_i''$). The sorted distortion levels are then pooled together into an overall distortion level or an overall quality metric. The sorted distortion levels may be pooled using a weighted sum, wherein the weight is larger when the sorted distortion level is greater.

16 Claims, 2 Drawing Sheets

(51) Int. Cl.
*H04N 19/192* (2014.01)
*H04N 19/48* (2014.01)
*H04N 19/89* (2014.01)
*H04N 17/00* (2006.01)

(52) U.S. Cl.
CPC ......... *H04N 19/154* (2014.11); *H04N 19/192* (2014.11); *H04N 19/48* (2014.11); *H04N 19/89* (2014.11)

(58) Field of Classification Search
USPC .................................................... 375/240.27
See application file for complete search history.

(56) References Cited

U.S. PATENT DOCUMENTS

| | | | |
|---|---|---|---|
| 8,027,264 | B2 | 9/2011 | Erman et al. |
| 2002/0071614 | A1* | 6/2002 | Ali ................ H04N 17/004 382/278 |
| 2002/0090134 | A1 | 7/2002 | Van Zon |
| 2002/0159521 | A1 | 10/2002 | Yan et al. |
| 2007/0206871 | A1* | 9/2007 | Jalil .............. H04N 19/176 382/233 |
| 2007/0237227 | A1 | 10/2007 | Yang et al. |
| 2008/0143837 | A1* | 6/2008 | Okamoto ........ H04N 17/00 348/180 |
| 2009/0208140 | A1 | 8/2009 | Jayant et al. |
| 2011/0075729 | A1* | 3/2011 | Dane ............... H04N 7/12 375/240.03 |
| 2011/0188704 | A1* | 8/2011 | Radhakrishnan .... H04N 17/004 382/100 |
| 2014/0002745 | A1* | 1/2014 | Seshadrinathan ...... H04N 5/911 348/606 |

FOREIGN PATENT DOCUMENTS

| | | |
|---|---|---|
| CN | 1669338 | 9/2005 |
| CN | 101390401 | 3/2009 |
| CN | 101578869 | 11/2012 |
| EP | 2119248 | 1/2011 |
| JP | 2004516566 | 6/2004 |
| JP | 2004520752 | 7/2004 |
| JP | 2009533008 | 9/2009 |
| WO | WO2002087259 | 10/2002 |
| WO | WO03030073 | 4/2003 |
| WO | WO2008081185 | 7/2008 |
| WO | WO2008088482 | 7/2008 |
| WO | WO2010103112 | 9/2010 |

OTHER PUBLICATIONS

Farias et al: "Perceptual analysis of video impairments that combine blocky, blurry, noisy, and ringing synthetic artifacts", Human Vision and Electronic Imaging X, vol. 5666, Mar. 18, 2005, SPIE, San Jose, CA.

* cited by examiner

300

400

VIDEO QUALITY MEASUREMENT CONSIDERING MULTIPLE ARTIFACTS

This application claims the benefit, under 35 U.S.C. § 365 of International Application PCT/CN2011/083020, filed 28 Nov. 2011, which was published in accordance with PCT Article 21(2) on 6 Jun. 2013.

TECHNICAL FIELD

This invention relates to video quality measurement, and more particularly, to a method and apparatus for determining an overall video quality metric in response to multiple artifacts.

BACKGROUND

Video quality losses may be caused by various events, for example, by lossy compression and transmission errors and they may be perceived by human eyes as various types of visual artifacts. For example, blockiness, ringing, and blurriness are typical artifacts caused by lossy compression.

On the other hand, different types of artifacts may be perceived when the video quality is degraded by transmission errors. For example, when a packet loss is detected at the transport layer, a decoder may apply error concealment in order to reduce the strength of visual artifacts. Artifacts may still be perceived after error concealment, and we denote the remaining artifacts as channel artifacts. In another example, when a reference frame is entirely lost, a decoder may freeze decoding and repeats the previously correctly decoded picture until a frame without referring to the lost frame is correctly received, thus causing a visual pause. We denote such a visual pause as a freezing artifact. The freezing artifact may also be caused by buffer underflow. For example, when there is a network delay, a frame may not be available yet at a scheduled display time (i.e., the buffer underflows) and the display pauses until the frame becomes available.

SUMMARY

According to a general aspect, picture data including a plurality of artifact types are accessed. Aligned distortion levels are sorted to obtain sorted distortion levels, wherein each of the aligned distortion levels corresponds to a respective one of the plurality of artifact types, and wherein a particular value of the aligned distortion levels corresponds to a respective perceived distortion level. An overall distortion level is determined in response to the sorted distortion levels, wherein a greater sorted distortion level has a greater impact on the overall distortion level.

According to another general aspect, picture data including a plurality of artifact types are accessed. Respective objective distortion levels are determined for the plurality of artifact types. The objective distortion levels are aligned to obtain the aligned distortion levels, wherein each of the aligned distortion levels corresponds to a respective one of the plurality of artifact types, and wherein a particular value of the aligned distortion levels corresponds to a respective perceived distortion level. The aligned distortion levels are sorted to obtain sorted distortion levels. An overall distortion level is determined as a weighted sum of the sorted distortion levels, wherein a first weight for a first sorted distortion level is greater than a second weight for a second sorted distortion level if the first sorted distortion level is greater than the second sorted distortion level.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

When multiple types of visual artifacts are present in a video, the artifact strength for an individual type of artifact, namely an artifact level or a distortion level, may be measured by a variety of methods.

The artifact strength may be ranked by subjective viewing tests, which are generally best but time consuming. In the present application, the artifact strength or distortion level ranked manually (for example, through subjective viewing tests) is denoted as the perceived distortion level or the subjective distortion level.

The artifact strength may also be estimated by a variety of algorithms aiming to predict the perceived distortion level. For example, existing artifact detection methods for measuring blockiness, ringing, blurriness, and freezing artifacts may be used to provide the distortion levels. In the present application, the distortion level estimated by algorithms is denoted as the distortion level, the estimated distortion level, or the objective distortion level.

The present principles estimate an overall distortion level or an overall quality metric in response to distortion levels from a variety of artifacts. Mathematically, the estimation can be described as:

$$D = f(d_1, d_2, \ldots, d_m),$$

where m is the number of artifact types under consideration, $d_i$, $i=1, \ldots, m$, is the estimated distortion level for artifact type i, and D is the overall distortion level to be estimated. In one embodiment, the overall distortion level D may be converted to an overall quality metric Q.

Figure 1:
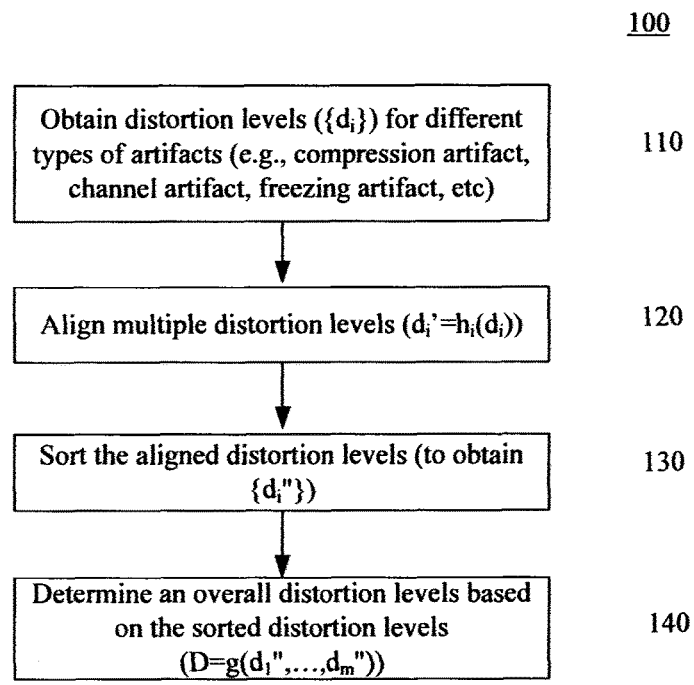
FIG. 1 is a flow diagram depicting an example for generating an overall video distortion level in response to multiple artifact types, in accordance with an embodiment of the present principles.

FIG. 1 illustrates an exemplary method 100 that determines an overall distortion level based on distortion levels of individual artifact types. At step 110, distortion levels can be determined respectively for individual artifact types. For example, when m types of artifacts are considered, a distortion level, denoted as $d_i$, can be determined for the $i^{th}$ type of artifact, where $i=1, \ldots, m$.

At step 120, the distortion levels are aligned. The step of distortion level alignment is to ensure that the distortion levels are adjusted so that the same distortion level of different types of artifacts corresponds to the same perceived distortion level. For ease of notation, the adjusted distortion level for $d_i$ is denoted as $d_i'$, and the mapping process from $d_i$ to $d_i'$ is denoted as a function $h_i( )$. That is, the distortion level alignment process may be mathematically denoted as $d_i'=h_i(d_i)$, where $i=1, \ldots, m$.

The aligned distortion levels, $d_i'$, $i=1, \ldots, m$, are then sorted, for example, in a descending order or in an ascending order, at step 130. The sorted distortion levels can be denoted as $d_i''$, $i=1, \ldots, m$. When they are sorted in a descending order, $d_1'' \geq \ldots \geq d_m''$, and when they are sorted in an ascending order, $d_1'' \leq \ldots \leq d_m''$.

Using the sorted distortion levels, an overall distortion level or a quality metric may be estimated through a pooling strategy at step 140. In the following, the steps of distortion level alignment (120) and overall distortion level determination are discussed in further detail.

Distortion Level Alignment

Figure 2:
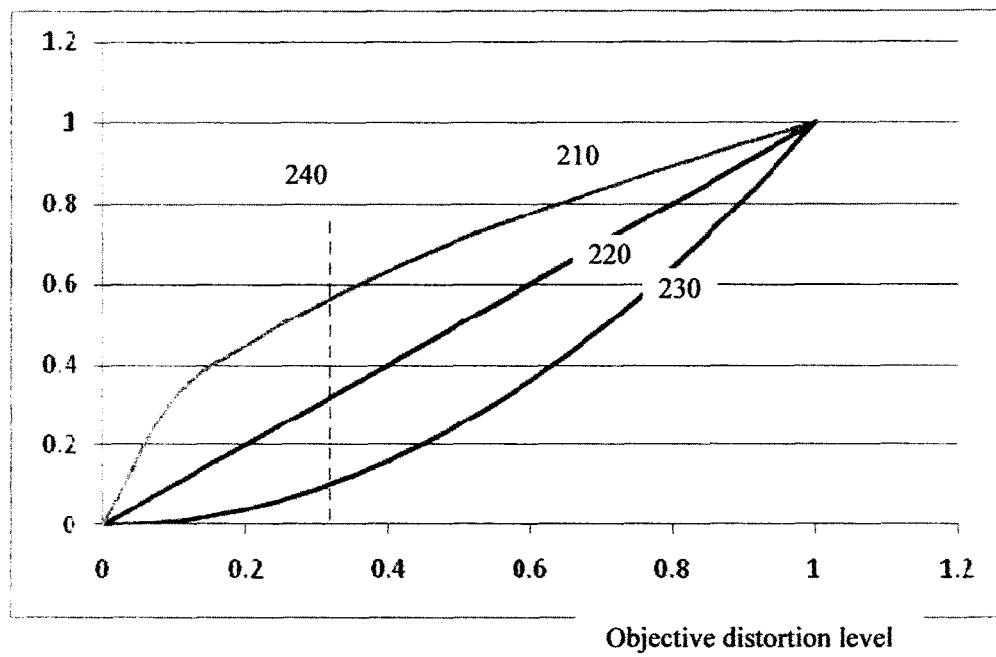
FIG. 2 is a pictorial example depicting how an objective distortion level corresponds to a subjective distortion level for three artifact types.

FIG. 2 illustrates exemplary relationships between the objective distortion levels ($d_i$) and the subjective distortion levels. In this example, the distortion levels are within the range of $(0, 1)$, where 0 corresponds to no distortion (i.e., the best quality) and 1 corresponds to the highest distortion level (i.e., the worst quality). In other embodiments, the distortion levels can be scaled or shifted to other ranges, for example, to $(1, 5)$ or to $(1, 100)$.

In FIG. 2, the horizontal axis represents the objective distortion level, and the vertical axis represents the subjective distortion level. Lines 210, 220, and 230 correspond to three types of artifacts respectively. For an objective distortion level represented by line 240, all three artifact types are measured at the same objective distortion level, but they correspond to different subjective distortion levels. Thus, values of estimated distortion levels ($d_1$, $d_2$, and $d_3$) are not comparable subjectively, and may not be used to compare the subjective distortion levels of different artifact types. For example, when $d_1 > d_2$, the perceived annoyance of the first artifact type may not necessarily be stronger than that of the second artifact type. In another example, when $d_1 = d_2$, the perceived annoyance of the first and second artifact types may not be identical.

The purpose of distortion level alignment is to make the distortion levels comparable. That is, to adjust the distortion levels so that the same distortion level of different artifact types corresponds to the same subjective distortion level. As discussed before, the alignment process for the $i^{th}$ type of artifact may be denoted mathematically as $d_i'=h_i(d_i)$.

To derive the function $h_i( )$, a curve fitting method may be used. In one embodiment, the function $h_i( )$ may be defined as a third-order polynomial function:

$$h_i(d_i) = \beta_{1,i} \times d_i^3 + \beta_{2,i} \times d_i^2 + \beta_{3,i} \times d_i + \beta_{4,i},$$

where $\beta_{1,i}$, $\beta_{2,i}$, $\beta_{3,i}$, and $\beta_{4,i}$ are model parameters, which may be trained by subjective datasets.

In other embodiments, the function $h_i( )$ may be defined as a polynomial functions at other orders, or it may be an exponential function, or a logarithmic function.

Overall Distortion Level Determination

After the alignment and sorting steps, the perceived artifact strength is controlled by the value of $d_i''$, regardless of its corresponding artifact type. For example, assuming videos $V_1$ and $V_2$ are affected by two types of artifacts: compression artifacts and channel artifacts, consider the following two exemplary scenarios:

1. In video $V_1$, the compression artifact is measured at $d_1'$ after the alignment step, and the channel artifact is measured at $d_2'$ ($d_1' > d_2'$, that is, the compression artifact is stronger than the channel artifact); and
2. In video $V_2$, the channel artifact is measured at $d_1'$ and the compression artifact is $d_2'$. That is, the channel artifact in video $V_2$ is at the same distortion level as that of the compression artifact in video $V_1$, and the compression artifact in video $V_2$ is at the same distortion level as that of the channel artifact in video $V_1$.

After sorting, for example, in a descending order, $d_1''=d_1'$ and $d_2''=d_2'$ for both videos $V_1$ and $V_2$. Since the overall distortion level is estimated based on the sorted distortion levels ($d_i''$), it would be the same for both $V_1$ and $V_2$, even the distortion levels for individual artifact types are different.

Thus, after the alignment and sorting steps, the overall distortion level may be predicted from the sorted objective distortion levels without considering the corresponding artifact types. Consequently, the problem of combining the distortion levels of multiple artifact types can be simplified.

Mathematically, the problem of pooling multiple sorted distortion levels into one overall distortion level can be denoted as $$D = g(d_1'', \ldots, d_m'').$$

Linear or non-linear functions may be used to represent the function $g( )$ and various training methods can be used to obtain model parameters for the function $g( )$. In one embodiment, a weighted sum is used:

$$D = g(d_1'', \ldots, d_m'') = \alpha_1 \times d_1'' + \alpha_2 \times d_2'' + \ldots + \alpha_m \times d_m'' + \alpha_{(m+1)}, \quad (1)$$

where $\alpha_i$, $i=1, \ldots, m+1$, are model parameters for the function $g( )$ and may be determined by a training process. In other embodiments, other methods, for example, a learning machine, a support vector machine (SVM), or an artificial neural network (ANN) may be used.

It is observed from our experiments that human eyes usually pays more attention to the strongest artifacts and evaluate the quality or distortion level of the video mainly based on these strongest artifacts. In addition, it is observed that the weaker the artifact is, the less impact is has on human perception. Thus, model parameter $\alpha_i > \alpha_j$ if $d_i'' > d_j''$.

In one embodiment, assuming $d_1''$ represents the strongest artifact, consequently $\alpha_1$ is greater than $\alpha_i$, $i \neq 1$. To speed up the computation, we may approximate Eq. (1) with $$D = g(d_1'', \ldots d_m'') = \alpha_1 \times d_1'' + \alpha_2 \quad .(2)$$

In other embodiments, we may choose to consider only the first few strongest artifacts.

As discussed in the alignment and sorting steps, training processes may be needed to obtain model parameters (for example, $\beta_{j,i}$ and $\alpha_i$). In the following, using the compression artifact, channel artifact, and freezing artifact as three exemplary artifact types, the training processes are discussed.

Firstly, video with different artifacts are created and a training dataset may be generated by including:
1. videos affected by coding artifacts only;
2. videos affected by channel artifacts only;
3. videos affected by freezing artifacts only; and
4. videos affected by all three artifact types.

This training dataset are to be used by both the alignment and pooling steps, where the first three types of videos are used by the alignment step and the fourth type of videos is used by the pooling step. Note that the training dataset should include all types of artifact types under consideration.

Secondly, subjective viewing tests can be performed over the training dataset to provide subjective distortion levels for individual videos. The subjective distortion levels can be denoted as $d_{s,j}$, $j=1, \ldots, N$, where N is the number of videos in the training dataset.

To obtain parameters for the alignment step, objective distortion levels ($d_j$, $j=1, \ldots, N$) can be obtained for individual videos, for example, using detection schemes for coding artifacts, channel artifacts, and freezing artifacts. After obtaining the subjective distortion levels and objective distortion levels, a curve fitting method, for example, a least mean square error (LMSE) fitting method, may be used to determine the model parameters $\beta_{1,i}$, $\beta_{2,i}$, $\beta_{3,i}$ and $\beta_{4,i}$.

To obtain parameters for the pooling step, the sorted distortion level ($d_1''$) can be obtained for the fourth type of videos (i.e., videos that contain all three artifact types), for example, using Eq. (1). Using the subjective distortion levels and corresponding sorted distortion levels ($d_i''$), the model parameters $\alpha_i$ may be calculated. For example, using one of ITU-T P.NBAMS datasets, where sample videos contain compression artifacts and freezing artifacts, the function g( ) is trained as:

$$g(d'_1{}^{d\_2''}) = 1.39 \times d_1^{+0.25 \times d\_2''} | 2.00.$$

The overall distortion level can be converted into an overall quality metric. In general, the higher the distortion level is, the lower the quality metric should be.

One advantage of the present distortion level estimation method is that it is independent of the distortion set. That is, the same estimation steps may be used when different types of artifacts are considered. For example, when the model parameters may be determined based on the compression artifacts, channel artifacts, and freezing artifacts, the same model parameters for the pooling step may be used when another set of artifacts (for example, blockiness, ringing, blurriness) is considered.

Figure 3:
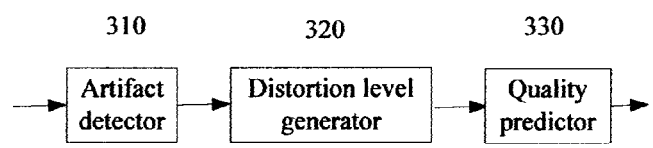
FIG. 3 is a block diagram depicting an example of a video quality monitor, in accordance with an embodiment of the present principles.

FIG. 3 depicts a block diagram of an exemplary video quality monitor 300. The input of apparatus 300 may include a transport stream that contains the bitstream. The input may be in other formats that contains the bitstream. The input may also be decoded videos with or without error concealment.

Artifact detector 310 estimates objective distortion levels for individual artifact types, at a bitstream level (i.e., the video is not reconstructed) or at a pixel level (i.e., the video is reconstructed). Distortion level generator 320 estimates an overall distortion level, for example, using method 100. Quality predictor 330 maps the overall distortion level into a quality score.

Figure 4:
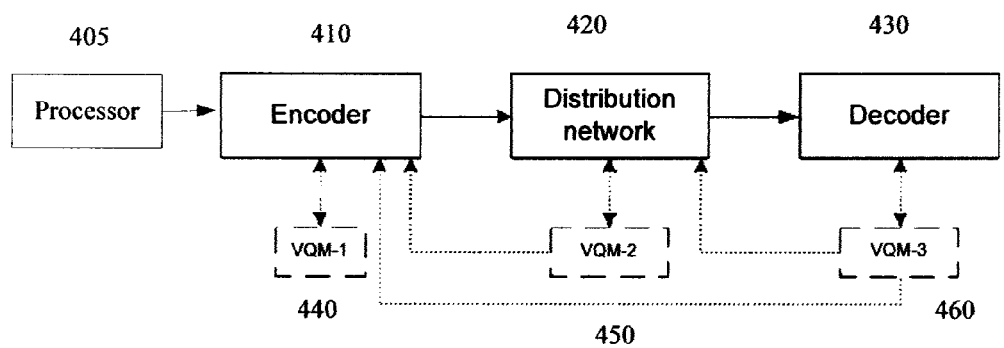
FIG. 4 is a block diagram depicting an example of a video processing system that may be used with one or more implementations.

Referring to FIG. 4, a video transmission system or apparatus 400 is shown, to which the features and principles described above may be applied. A processor 405 processes the video and the encoder 410 encodes the video. The bitstream generated from the encoder is transmitted to a decoder 430 through a distribution network 420. A video quality monitor may be used at different stages.

In one embodiment, a video quality monitor 440 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 450 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 460 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the user may have access to several error concealment techniques. A video quality monitor can calculate quality metrics for different error concealment techniques and automatically choose which concealment technique to use based on the calculated quality metrics.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, distortion measurement, quality measuring, and quality monitoring. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a game console, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
   accessing picture data including a plurality of artifact types;
   adjusting a corresponding objective distortion level of each respective one of the plurality of artifact types to obtain aligned distortion levels for the plurality of artifact types, wherein each of the aligned distortion levels corresponds to a respective one of the plurality of artifact types, and wherein if an aligned distortion level for one of the plurality of artifact types is same as another aligned distortion level for another one of the plurality of the artifact types, then perceived distortion levels corresponding to the two different artifact types are substantially same;
   sorting the aligned distortion levels regardless of their corresponding artifact types to provide sorted aligned distortion levels; and
   determining an overall distortion level in response to a weighted sum of the sorted aligned distortion levels, wherein a greater sorted aligned distortion level has a greater impact on the overall distortion level,
   wherein a first weighting factor, applied to a first sorted aligned distortion level for obtaining the weighted sum, is greater than a second weighting factor, applied to a second sorted aligned distortion level for obtaining the weighted sum, if the first sorted aligned distortion level is greater than the second sorted aligned distortion level, and
   wherein the application of the first weighting factor to the first sorted aligned distortion level increases the value of the first sorted aligned distortion level.

2. The method of claim 1, wherein the overall distortion level is determined in response to a subset of the sorted aligned distortion levels.

3. The method of claim 1, further comprising:
   determining a quality metric in response to the overall distortion level.

4. The method of claim 1, further comprising:
   determining respective objective distortion levels for the plurality of artifact types.

5. The method of claim 4, wherein the respective objective distortion levels for the plurality of artifact types are determined at a bitstream level.

6. The method of claim 1, wherein the aligning the objective distortion levels is performed as a polynomial function.

7. The method of claim 1, wherein the plurality of artifact types include at least one of compression artifacts, channel artifacts, freezing artifacts, blockiness, ringing, and blurriness.

8. An apparatus, comprising at least a memory and one or more processors, the one more processors being configured to:
   adjust objective distortion levels to obtain aligned distortion levels for a plurality of artifact types, wherein if an aligned distortion level for one of the plurality of artifact types is same as another aligned distortion level for another one of the plurality of the artifact types, then perceived distortion levels corresponding to the two different artifact types are substantially same,
   sort the aligned distortion levels regardless of their corresponding artifact types to provide sorted aligned distortion levels, and
   determine an overall distortion level in response to a weighted sum of the sorted aligned distortion levels,
   wherein a greater sorted aligned distortion level has a greater impact on the overall distortion level,
   wherein a first weighting factor, applied to a first sorted aligned distortion level for obtaining the weighted sum, is greater than a second weighting factor, applied to a second sorted aligned distortion level for obtaining the weighted sum, if the first sorted aligned distortion level is greater than the second sorted aligned distortion level, and
   wherein the application of the first weighting factor to the first sorted aligned distortion level increases the value of the first sorted aligned distortion level.

9. The apparatus of claim 8, wherein the one or more processors are configured to determine the overall distortion level in response to a subset of the sorted aligned distortion levels.

10. The apparatus of claim 8, wherein the one or more processors are further configured to determine a quality metric in response to the overall distortion level.

11. The apparatus of claim 8, wherein the one or more processors are further configured to determine respective objective distortion levels for the plurality of artifact types.

12. The apparatus of claim 8, wherein the one or more processors are configured to determine respective objective distortion levels for the plurality of artifact types at a bitstream level.

13. The apparatus of claim 8, wherein the plurality of artifact types include at least one of compression artifacts, channel artifacts, freezing artifacts, blockiness, ringing, and blurriness.

14. A non-transitory processor readable medium having stored thereupon instructions for causing one or more processors to collectively perform:
- accessing picture data including a plurality of artifact types;
- adjusting objective distortion levels to obtain aligned distortion levels for the plurality of artifact types, wherein if an aligned distortion level for one of the plurality of artifact types is same as another aligned distortion level for another one of the plurality of the artifact types, then perceived distortion levels corresponding to the two different artifact types are substantially same;
- sorting the aligned distortion levels regardless of their corresponding artifact types to provide sorted aligned distortion levels; and
- determining an overall distortion level in response to a weighted sum of the sorted aligned distortion levels,
- wherein a greater sorted aligned distortion level has a greater impact on the overall distortion level,
- wherein a first weighting factor, applied to a first sorted aligned distortion level for obtaining the weighted sum, is greater than a second weighting factor, applied to a second sorted aligned distortion level for obtaining the weighted sum, if the first sorted aligned distortion level is greater than the second sorted aligned distortion level, and
- wherein the application of the first weighting factor to the first sorted aligned distortion level increases the value of the first sorted aligned distortion level.

15. The method of claim 1, wherein the subset corresponds to the strongest artifact only.

16. The apparatus of claim 8, wherein the subset corresponds to the strongest artifact only.

\* \* \* \* \*